United States Patent [19]
Saito

[11] Patent Number: 5,291,364
[45] Date of Patent: * Mar. 1, 1994

[54] MAGNETIC HEAD POSITION MEASURING DEVICE

[75] Inventor: Etsuro Saito, Kanagawa, Japan

[73] Assignee: Sony Corporation, Tokyo, Japan

[*] Notice: The portion of the term of this patent subsequent to Mar. 23, 2010 has been disclaimed.

[21] Appl. No.: 16,510

[22] Filed: Feb. 11, 1993

Related U.S. Application Data

[63] Continuation of Ser. No. 619,140, Nov. 28, 1990, Pat. No. 5,196,979.

[30] Foreign Application Priority Data

Nov. 30, 1989 [JP] Japan ................................. 1-311696

[51] Int. Cl.⁵ .............................................. G11B 5/40
[52] U.S. Cl. ...................................... 360/137; 360/75
[58] Field of Search ........................... 360/137, 75, 128

[56] References Cited

U.S. PATENT DOCUMENTS 5,079,432  1/1992  Miller ................................ 250/561
5,196,979  3/1993  Saito ................................. 360/137

FOREIGN PATENT DOCUMENTS 2-244401  9/1990  Japan .

Primary Examiner—Robert S. Tupper
Attorney, Agent, or Firm—William S. Frommer

[57] ABSTRACT

A magnetic head position detecting device having enhanced miniaturization and improved measuring accuracy. In the device, the output light beam of a light source is reflected by a first mirror so as to be applied to a rotary drum or the slide contact surface of a magnetic head. The light beam reflected from the rotary drum or the magnetic head is then reflected by a second mirror so as to be detected by a light receiving element. Furthermore, in the device, the output signal levels of a light receiving element corresponding to the position of light beams from the rotary drum and the slide contact surface of the magnetic head are subjected to comparison, so that the amount of protrusion of the slide contact surface of the magnetic head from the rotary drum can be measured with high accuracy.

6 Claims, 8 Drawing Sheets

MAGNETIC HEAD POSITION MEASURING DEVICE

This is a continuation of U.S. patent application Ser. No. 07/619,140 filed Nov. 28, 1990, now U.S. Pat. No. 5,196,979.

BACKGROUND OF THE INVENTION

This invention relates to a device for measuring the position of a rotary magnetic head in a video tape recorder adapted to record and reproduce video signals.

Conventionally, in a high grade video tape recorder, magnetic head wear due to slide contact of the magnetic tape is corrected by periodically inspecting the video tape recorder.

As the magnetic head is worn, there is a corresponding change in its electromagnetic conversion characteristic. The change is corrected by readjusting the recording current and the reproducing equalizer circuit's characteristic. When it is determined that the magnetic head is worn too much to perform recording and reproducing operations, the magnetic head is replaced together with the rotary drum.

However, this method is disadvantageous in that whenever the inspection time comes, it is necessary to stop the use of the video tape recorder for inspection, even if the inspection shows that adjustment was unnecessary in fact.

In order to overcome this difficulty, a magnetic recording and reproducing device has been proposed in the art in which the amount of wear of the magnetic head is continuously measured with optical means and the recording and reproducing systems are continually adjusted according to the result of such measurement. An example of such a device is disclosed in Japanese Patent Application No. 64165/1989 owned by the assignee of the present invention.

As shown in FIG. 1 in this prior art magnetic head position measuring device 1 the output light beam LA1 of a light emitting element 2 (hereinafter referred to as "an irradiating light beam LA1", when applicable) is applied through a condenser lens LEN1 to a magnetic head 4 on a rotary drum 3 at a predetermined angle and reflected from the magnetic head 4. The light beam LA2 thus reflected (hereinafter referred to as "a reflected light beam LA2", when applicable) is applied through another condenser lens LEN2 to a position detecting element 6. Position detecting element 6 outputs a position detection signal S1 corresponding to the incident position of the reflected light beam LA2. This signal S1 is then applied to an amount-of-wear detecting circuit 7. The latter detecting circuit detects the amount of protrusion of the magnetic head beyond the peripheral surface of the rotary drum 3, i.e., determines the amount of wear of the magnetic head 4.

The condenser lens LEN1 on the irradiation side is positioned at a point along the distance between the light emitting element 2 and the magnetic head 4 is where the ratio $L_1:L_2$ will substantially concentrate the irradiating light beam LA1 at a point $M_1$ on the magnetic head 4.

Similarly, the condenser lens LEN2 on the reflection side is positioned at the point where the distance between the magnetic head 4 and the position detecting element 6 is divided in the same ratio of $L_1:L_2$. Thus, the image of the point $M_1$ on the magnetic head 4 is formed at a point $N_1$ on the position detecting element 6.

When the magnetic head 4 is worn, as indicated by the broken line in FIG. 1, the incident position of the irradiating light beam LA1 is shifted from the point $M_1$ to a point $M_2$ on the prolongation of the irradiating light beam LA1. The light beam LA2 reflected from the point $M_2$ through the center O of the condenser lens LEN2 impinges at a point $N_2$ on the position detecting element. That is, the incident position of the reflected light beam is shifted from the point $N_1$ to the point $N_2$.

The amount of shift $P_2$ (=$N_1-N_2$) of the incident position of the reflected light beam LA2, due to the wear of the magnetic head 4, can be represented by the following equation (1), because the triangles $\triangle OM_1M_2$ and $\triangle ON_1N_2$, formed by the wear $P_1$ (=$M_1-M_2$) and the optical path difference:

$$P_2 = (L_1/L_2) \times P_1 \qquad (1)$$

In the above-described conventional magnetic head position measuring device 1, the amount of wear $P_1$ of the magnetic head 4 is very small, for example, a maximum of 0.05 mm. Hence, in order to increase the detection accuracy of the amount of wear $P_1$, it is necessary to increase the ratio $L_1/L_2$ in Equation (1), i.e., the distance $L_1$. This means that it is necessary to increase the distance between the condenser lens LEN2 and the position detecting element 6 rendering the device unavoidably bulky.

Furthermore, in this prior art position measuring device 1, the lens system magnifies the amount of wear $P_1$ of the magnetic head 4 only several times (about twice in practice). Therefore, the detection is relatively low in accuracy.

In addition, with this conventional position measuring device, during installation of the rotary drum 3 of magnetic head 4, a reference value for measuring the amount of wear $P_1$, namely, a magnetic head protrusion position reference value, must be stored in a memory provided, for instance, in the amount-of-wear detecting device 7. It also is necessary to maintain the reference value in the memory.

SUMMARY AND OBJECTS OF THE INVENTION

A first object of this invention is to provide a magnetic head position measuring device which is smaller than a conventional magnetic head position measuring device.

A second object of the invention is to provide a magnetic head position measuring device which is capable of measuring the amount of protrusion of a magnetic head with higher accuracy than a conventional magnetic head position measuring device.

A third object of the invention is to provide a magnetic head position measuring device which can measure the amount of wear of a magnetic head with higher accuracy than a conventional magnetic head position measuring device.

A fourth object of the invention is to provide a magnetic head position measuring device which is capable of detecting the adherence of dust to the part of a rotary magnetic head which slides against the magnetic tape (so-called "head clog") with high accuracy.

A fifth object of the invention is to provide a magnetic head position measuring device which can accurately measure the positions of magnetic heads provided on a common head base with the magnetic heads being spaced from each other along the direction of the rotary shaft, and which can detect the head clog with high accuracy.

A sixth object of the invention is to provide a magnetic head position measuring device which is able to accurately detect eccentricity of the rotary drum or rotary disk in a recording and reproducing device with a rotary magnetic head.

A seventh object of the invention is to provide a magnetic head position measuring device which is simple in construction and which can produce signals representing the states of a magnetic head which can be utilized for self-diagnosis of a recording and reproducing device with a rotary magnetic head or for automatic characteristic correcting control of the circuit thereof.

In accordance with an aspect of this invention, a magnetic head position measuring device comprises:

an irradiating optical system adapted to apply an irradiation light beam emitted from light source means to magnetic heads arranged on a rotary drum, and a reflection optical system adapted to lead the light beam reflected from the slide contact surfaces of the magnetic heads to detecting means to detect the positions of the slide contact surfaces of the magnetic heads.

In accordance with this aspect, in the irradiation optical system, the irradiating light beam emitted from the light source means is reflected by the first reflecting optical system so as to be applied through the first condenser lens to the rotary drum to form the light source image at a predetermined irradiation point, and in the reflection optical system the light beam reflected from the slide contact surfaces of the magnetic heads when the light source image is formed thereon extends through a second condenser lens and is reflected by a second reflecting optical system, so that the reflected light source image is formed on light receiving means.

In accordance with another aspect of the present invention, a magnetic head position measuring device comprises an irradiating optical system adapted to apply an irradiation light beam emitted from light source means to magnetic heads arranged on a rotary drum, a reflection optical system adapted to lead the light beam reflected from the slide contact surfaces of the magnetic heads to detecting means to detect the positions of the slide contact surfaces of the magnetic heads and means for outputting a head position detection signal. In accordance with this aspect of the invention, a signal part having a first position signal level corresponding to the light beam reflected from the rotary drum and a signal part having a second position signal level corresponding to the slide contact surface of the magnetic head are extracted from head position detection signal $S_{OUT}$, and the amount of protrusion of each slide contact surface from the rotary drum is measured from the difference between the first and second position signal levels.

In accordance with another aspect of the present invention, a magnetic head position measuring device comprises: an irradiation optical system for applying an irradiating light beam emitted from light source means to a rotary drum and magnetic heads which are arranged staggered on the rotary drum, a reflection optical system for leading a light beam reflected from the slide contact surface of each of the magnetic heads to detecting means to detect the position of the slide contact surface of the magnetic head, and means for outputting position detecting signal from the detecting means. In accordance with this aspect of the invention a first signal part having a first position signal level corresponding to the light beam reflected from the rotary drum is extracted, and a second signal part having second position signal levels respectively and corresponding to the slide contact surfaces of the magnetic heads, which are arranged staggered on the rotary drum, are extracted from the head position detection signal outputted from the detecting means, and the amounts of protrusion of the slide contact surfaces from the rotary drum are measured from the differences and between the first position signal level and the second position signal levels respectively.

The above, and other objects, features and advantages of the invention will become more apparent from the following detailed description when read in conjunction with the accompanying drawings.

DETAILED DESCRIPTION OF PREFERRED EMBODIMENTS OF THE INVENTION

Preferred embodiments of this invention will now be described with reference to the accompanying drawings.

First Embodiment of the Invention

Figure 1:
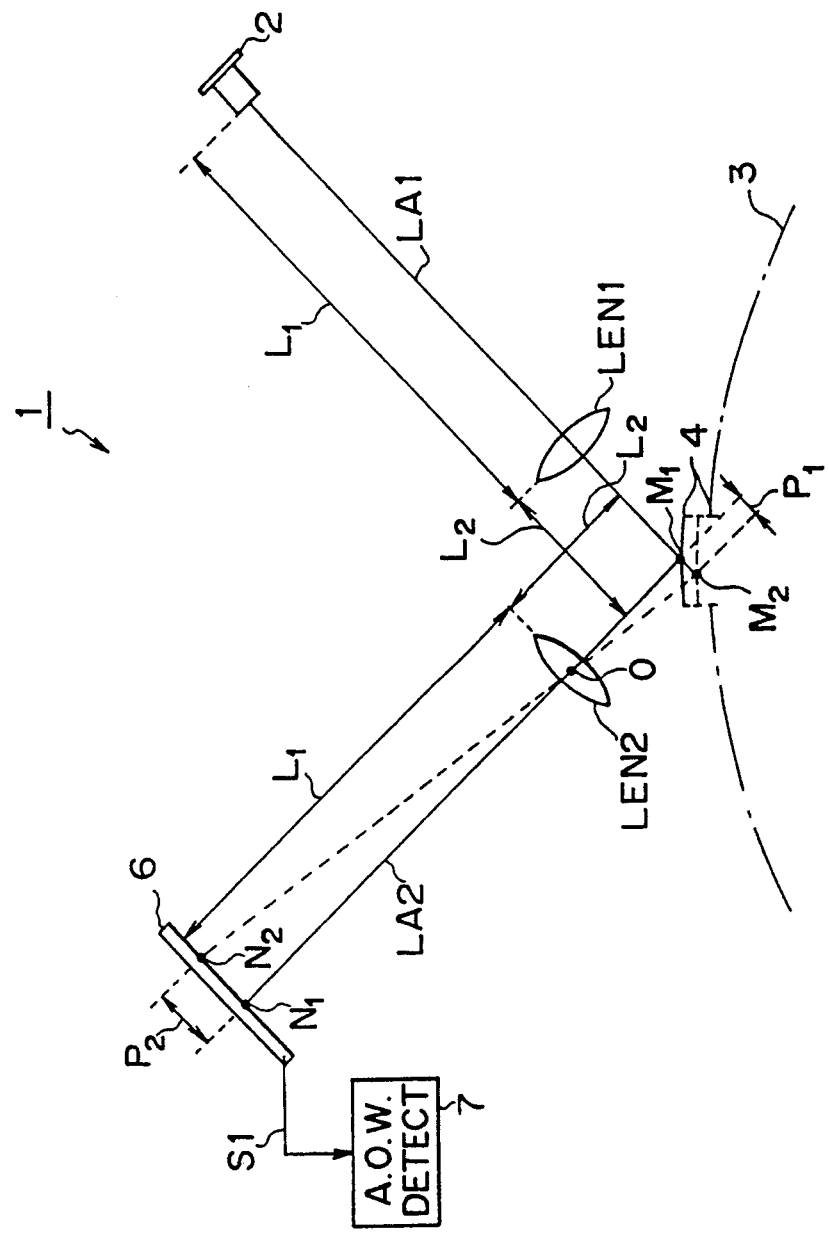
FIG. 1 is an explanatory diagram depicting a conventional magnetic head position measuring device.
Figure 2:
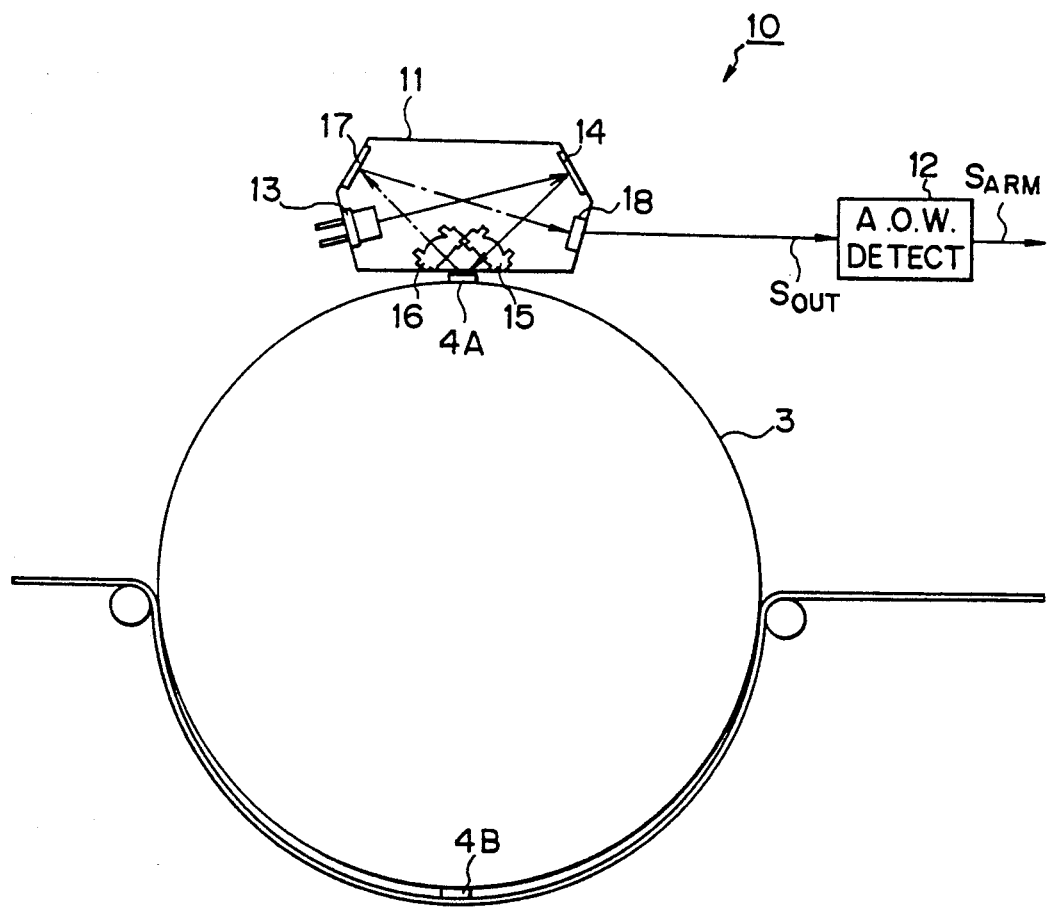
FIG. 2 is a plan view outlining the arrangement of a magnetic head position measuring device in accordance with a first embodiment of the present invention.

A first embodiment of the invention is depicted in FIG. 2. For convenience, where there are components which have been already described with reference to FIG. 1, they are designated by the same reference numerals or characters.

As depicted in FIG. 2, a magnetic head position measuring device according to the invention, generally denoted as 10, comprises an optical position detecting head section 11 for outputting a position detection signal $S_{OUT}$ and an amount-of-wear detecting circuit 12 for processing the position detection signal $S_{OUT}$. The optical position detecting head section 11 is positioned so as to be adjacent the loci of a pair of magnetic heads 4A and 4B positioned diametrically opposite to each other, (at an angular interval of 180°) at a region of the rotary drum where the magnetic tape is not wrapped thereabout.

Figure 3:
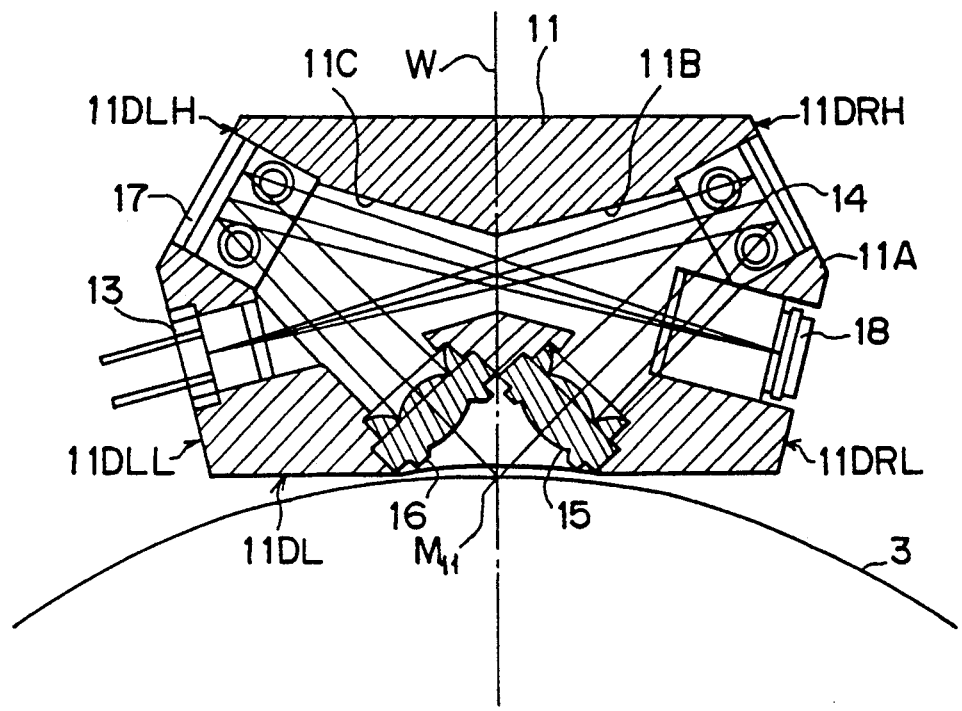
FIG. 3 is a sectional view of the device shown in FIG. 2, showing the arrangement of an optical position detecting head section in the device.

The optical position detecting head section 11, as shown in FIG. 3, includes a supporting block 11A which is hexagonal in section. An irradiation optical path hole 11B and a reflection optical path hole 11C are formed in supporting block 11A.

The irradiation optical path hole 11B extends from a lower left side wall 11DLL to an upper right side wall 11DRH, and is then directed downwardly to the left so that it reaches an irradiation point $M_{11}$ located substantially at the center of the bottom 11DL. A light emitting element 13 including an LED (light emitting diode) is fitted in the lower left side wall 11DLL. The output light beam of the light emitting elements 13 is reflected by a mirror 14 fitted in the upper right side wall 11DRH, and then concentrated at an irradiation point $M_{11}$, through an irradiating condenser lens 15 provided near the irradiation point $M_{11}$.

In a similar manner, the reflection optical path hole 11C extends from the bottom 11DL of the supporting block 11 to an upper left side wall 11DLH, and is then directed downwardly to the right to reach a lower right side wall 11DRL. Thus, the light beam reflected from the irradiation point $M_{11}$ advances through a reflecting condenser lens 16 to a mirror 17 fitted in the upper left side wall 11DLH, where it is reflected towards a light receiving element 18 including a position detecting element and which is fitted in the lower right side wall 11DRL. As a result, the light receiving element 18 outputs a position detection signal corresponding to the position of the irradiation point M11.

As is apparent from the above description, the bent irradiation optical path extending from the light emitting element 13 through the mirror 14 and the condenser lens 15 to the irradiation point $M_{11}$ and the bent reflection optical path extending from the irradiation point $M_{11}$ through the condenser lens 16 and the mirror 17 to the light receiving element 18, cross each other and are symmetrical with respect to a phantom line W passing through the irradiation point $M_{11}$.

When the magnetic heads 4A and 4B on the rotary drum 3 are not yet worn, the loci of the slide contact surfaces of the magnetic heads 4A and 4B with the magnetic tape meet the irradiation point $M_{11}$ of the optical position detecting head section 11. Hence, the image of the light emitting point of the light emitting element, namely, a light source image, is formed at a irradiation point $M_{11}$ via the bent irradiation optical path. This light source image is then reflected by the slide contact surfaces of the magnetic heads 4A and 4B and formed on the light receiving surface of the light receiving element 18, after advancing along the described bent reflection optical path.

Figure 4:
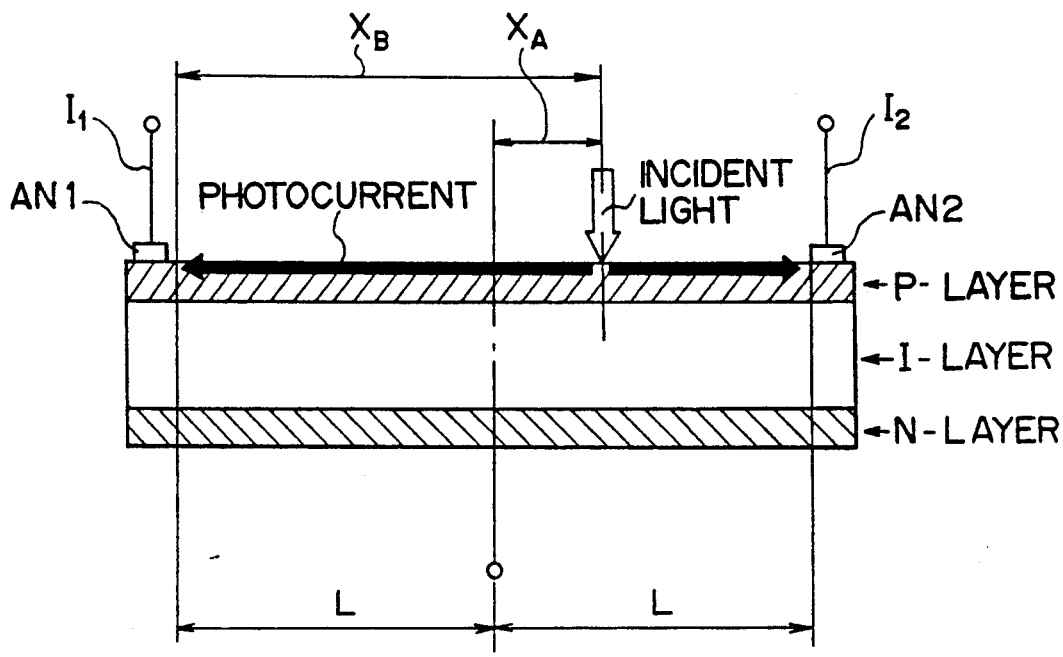
FIG. 4 is an explanatory diagram showing the structure of a position detecting element included in the device according to the invention.
Figure 5:
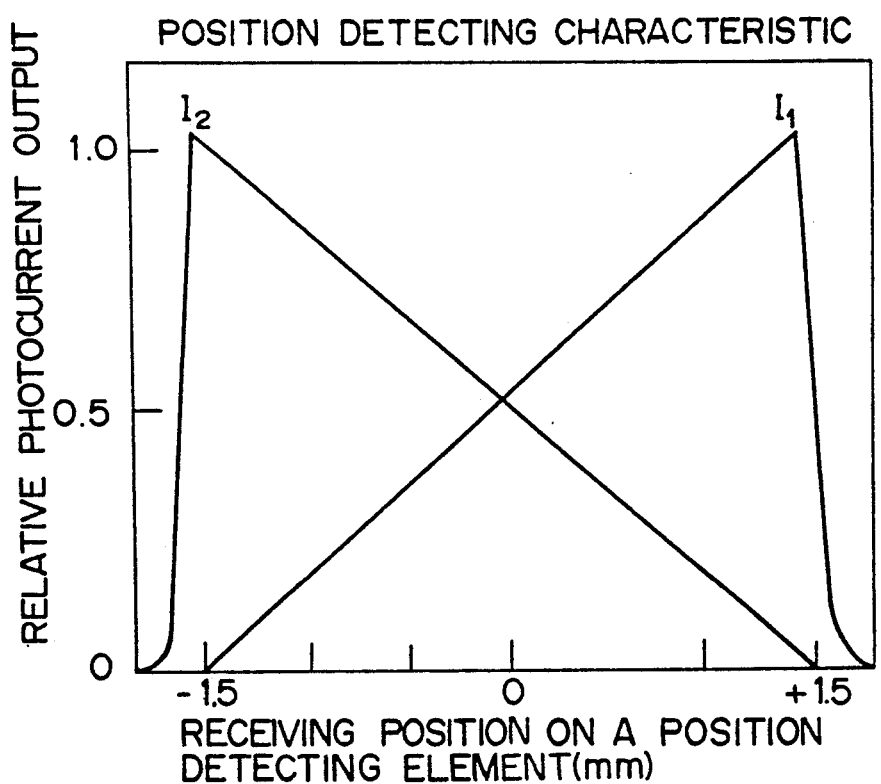
FIG. 5 is a graphical representation indicating the position detection characteristic of the position detecting element.

The position detecting element employed as the light receiving element 18 is constructed as shown in FIG. 4. When a predetermined bias is applied to the element, the light receiving element outputs currents $I_1$ and $I_2$ at anodes AN1 and AN2, respectively, corresponding to where the light strikes the light receiving element, as shown in FIG. 5. Hence, the light receiving position X can be obtained from the difference between $I_1$ and $I_2$ or the ratio thereof. In the case where the center of the position detecting element is the origin, the light receiving position $X_A$, can be obtained from the following Equation (2):

$$(I_2-I_1)/(I_1+I_2)=X_A/L \qquad (2)$$

In the case where the end of the position detecting element is the origin, the light receiving position $X_B$ can be obtained from the following equation (3):

$$(I_2-I_1)/(I_1+I_2)=(X_B-L)/L \qquad (3)$$

The output signal of the light receiving element (or position detecting element) is a signal representing the position data obtained from the aforementioned Equation (2) of (3). This will be referred to as head position detection signal $S_{OUT}$.

Figure 6:
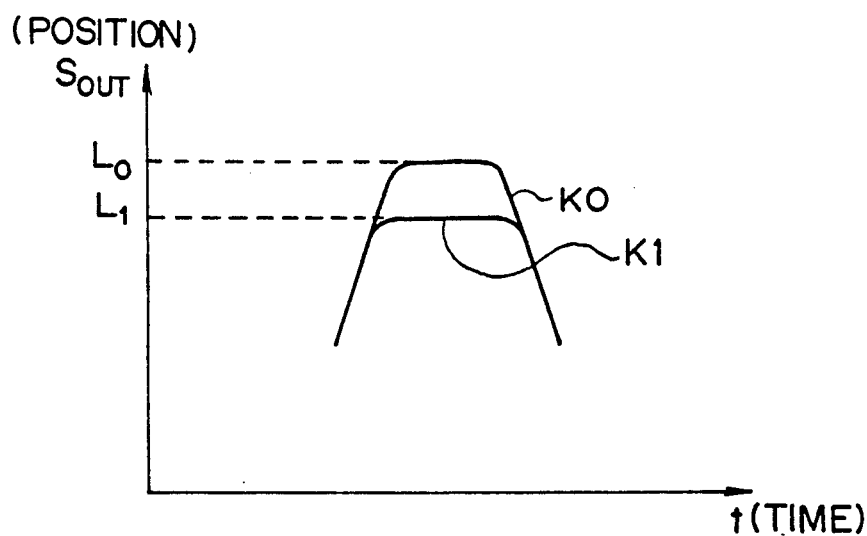
FIG. 6 is a waveform diagram showing a head position detection signal.

The relationships between the magnetic heads 4A and 4B and the head position detection signal will now be described with reference to FIG. 6.

While the slide contact surfaces of the magnetic heads 4A and 4B are approaching the irradiation point $M_{11}$ of the optical position detecting head section 11, passing through it, and going away from it, the light receiving element 18 outputs the head position detection signal $S_{OUT}$. Thus, $S_{OUT}$ indicates a position $L_O$ while the sliding surfaces are passing through the irradiation point $M_{11}$, as indicated by the characteristic curve KO in FIG. 6.

When the magnetic heads 4A and 4B are worn, that is, they are reduced in height, the irradiation point $M_{11}$ of the optical position detecting head section 11 is retracted correspondingly from its original unworn, position. As before, the light source image formed on the magnetic heads 4A and 4B reaches the light receiving element 18 along the bent reflection optical path. In this case, however, the position of the light source image formed on the light receiving element 18 is correspondingly shifted by the magnification of the amount of wear of the heads by the condenser lens. As a result, the head position detection signal $S_{OUT}$ provided as the slide contact surfaces pass through the irradiation point $M_{11}$ is lowered, as indicated by the characteristic curve K1 and FIG. 6.

The amount-of-wear detecting circuit 12 uses the position data $L_O$ of the head position detection signal $S_{OUT}$ provided before the heads are worn, the evaluate the reduction of the head position detection signal $S_{OUT}$ relative to the position data L which is provided after the heads are worn. When the reduction exceeds a predetermined threshold value, the amount-of-wear detecting circuit 12 determines that it is necessary to replace the magnetic head 4A or 4B, and outputs an alarm signal $S_{ARM}$.

With the magnetic head position measuring device thus constructed, the wear of the magnetic head 4A or 4B can be detected positively. Employment of the optical position detecting head section having the bent reflection optical path contributes to miniaturization of the entire measuring device.

Because, the magnetic head position measuring device of the invention bends the irradiating light beam and the reflected light beam, the optical path is sufficiently long for increasing accuracy without increasing the size of the device. Thus, with the device, even a small amount of wear of the magnetic head can be accurately magnified and detected.

Second Embodiment of the Invention

A second embodiment of the invention will now be described with reference to FIG. 7. As before, where there are components which have been previously described with reference to either FIG. 1, i.e., the prior art, or FIG. 2, i.e., the first embodiment of the present invention, they are designated by the same reference numerals or characters. As is apparent from a comparison of FIGS. 7 and 2, the second embodiment is the same in construction as the first embodiment except that the second embodiment has an amount-of-protrusion measuring circuit for processing the head position detection signal $S_{OUT}$ provided by the optical position detecting head section 11.

The amount-of-protrusion detecting circuit 21 utilizes the position signals contained in the head position detection signal $S_{OUT}$, i.e., it utilizes the position signal part $S_{OUT0}$ provided when the magnetic head 4A or 4B is adjacent the optical position detecting head section 11, and a position signal part $S_{OUT1}$ provided when the outer cylindrical wall of the rotary drum 3 is adjacent the optical position detecting head section 11, to evaluate the amount of protrusion of the slide contact surfaces of the magnetic heads 4A and 4B from the outer cylindrical wall of the rotary drum 3.

Figure 8:
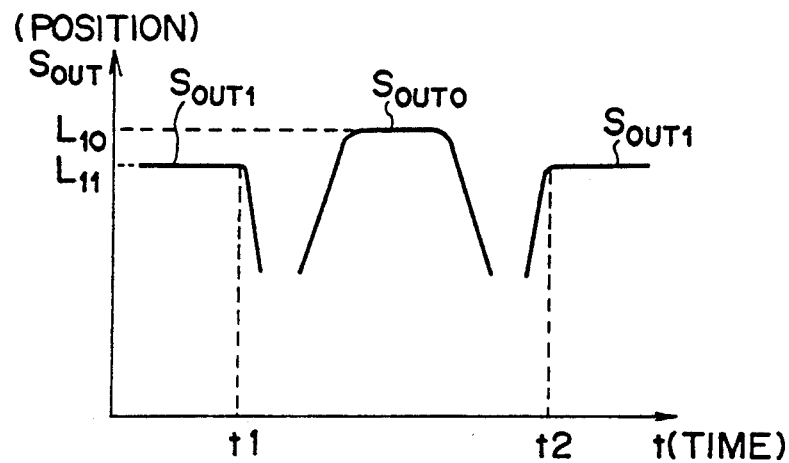
FIG. 8 is a signal waveform diagram depicting the measurement of an amount of protrusion of a magnetic head.

As graphically represented in FIG. 8 the amount-of-protrusion measuring circuit 21 reads a position signal level $L_{11}$ representing the position of the outer cylindrical wall of the rotary drum 3 during the period when the optical position detecting head section 11 is adjacent the outer cylindrical wall of the rotary drum 3 (before $t_1$, or after $t_2$ in FIG. 8), and the optical position detecting head section 11 reads a position signal level $L_{10}$ representing the position of the slide contact surface of the magnetic head 4A or 4B during the time between $t_1$ to $t_2$ when optical position detecting head section 11 is adjacent the magnetic head 4A or 4B.

The amount-of-protrusion detecting circuit 21 obtains the difference between the levels of the position signals $L_{10}$ and $L_{11}$ thus read (according to the following Equation (4)) through an arithmetic operation, and employs it as the amount of protrusion $P_1$ of the magnetic head 4A or 4B from the rotary drum 3. Thus:

$$\Delta P_1 = |L_{10} - L_{11}| \qquad (4)$$

With the above-described device, the position or level of the slide contact surface of the magnetic head 4A or 4B relative to the outer cylindrical wall of the rotary drum 3 can be detected. Hence, self-diagnosis of the state of wear of the head slide contact surface can be realized with ease.

For example, in determining when replacement of the magnetic head 4A or 4B is required due to wear of the slide contact surface, the amount of wear may be evaluated from the difference between the position data provided before and after it is worn. Thus, with the device described above, a memory for storing position data can be eliminated, resulting in a simplified construction.

Furthermore, the device of the invention may be employed for a video tape recorder in which its rotary drum 3 is different in radius, or where the rotary drum 3 is eccentric without affecting the result, even if means for correcting detected data is not provided.

Furthermore, with the device, the eccentricity of the rotary drum 3 can be measured by obtaining the differences between the head position signals $S_{OUT}$ provided by the light receiving element 18 in correspondence to a plurality of points on the outer cylindrical wall of the rotary drum. Therefore, in determining the need to replace the rotary drum 3, the eccentricity can be compensated for with high accuracy by measurement of the amount of eccentricity.

In addition, with the device according to this invention, detection of head clog can be performed with high accuracy. The magnetic powder of the magnetic tape and other dust deposit gradually o the slide contact surface of the magnetic head, so that the slide contact surface is gradually deformed. This deformation is commonly referred to as head clog. This deformation can be readily detected by the amount-of-protrusion measuring circuit 21 which reads the position data of the head position detection signal $S_{OUT}$.

The method of measuring an amount of protrusion of a magnetic head in the second embodiment is a method of detecting the difference between two parts, a so-called "floating method". In this method, mechanical offsets such as, for instance, the fluctuation in position of the outer cylindrical wall of the rotary drum caused during machining, can be completely disregarded. Hence, with the described device, the results of measurement are very accurate.

Third Embodiment of the Invention

A third embodiment of the invention will now be described with reference to FIG. 9, in which parts corresponding functionally to those already described with reference to FIG. 7, the second embodiment of the invention, are designated by the same reference numerals or characters.

A rotary drum 3 has a first pair of magnetic heads 25A and 25B positioned diametrically opposite to each other and a second pair of magnetic heads 26A and 26B positioned diametrically opposite to each other. Of those magnetic heads, the magnetic heads 25A and 26A are positioned in staggered relationship to each other. In particular, they are so arranged that they are shifted from each in the direction of rotation of and in the direction of the axis of the rotary drum 3. The magnetic heads 25B and 26B are also relatively arranged in the same manner. In the third embodiment, the magnetic head position measuring device 27 has a light emitting element 28 adapted to emit an irradiating light beam LA21 whose section is rectangular and elongated in the direction of the axis of rotation of the rotary drum 3 so as to irradiate both of the magnetic heads 25A and 26A (or 25B and 26B). The irradiating light beam LA21 is applied through a condenser lens 29 to the rotary drum 3 and the magnetic heads 25A and 26A so that a light source image 30 is formed on them. A light beam LA22 reflected from the magnetic heads 25A and 26A is applied through a condenser lens 31 to form a light source image on a light receiving element 32 which includes a position detecting element.

Figure 9:
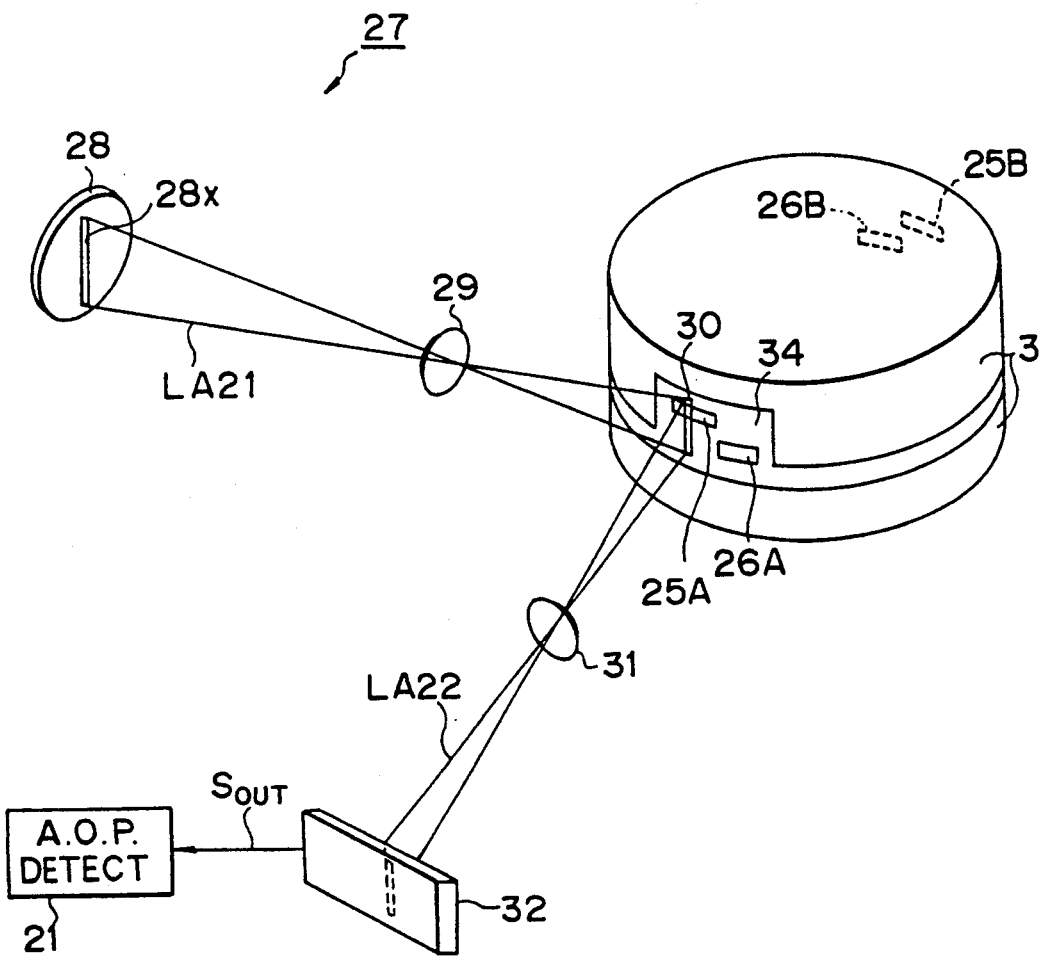
FIG. 9 is a perspective view showing the arrangement of a magnetic head position measuring device in accordance with a third embodiment of the invention.

The light source image is elongated vertically, that is, parallel to the drum as shown in FIG. 9. The positions of a plurality of magnetic heads covered by the length of the light source image can thus be detected, as will be described.

Figure 10:
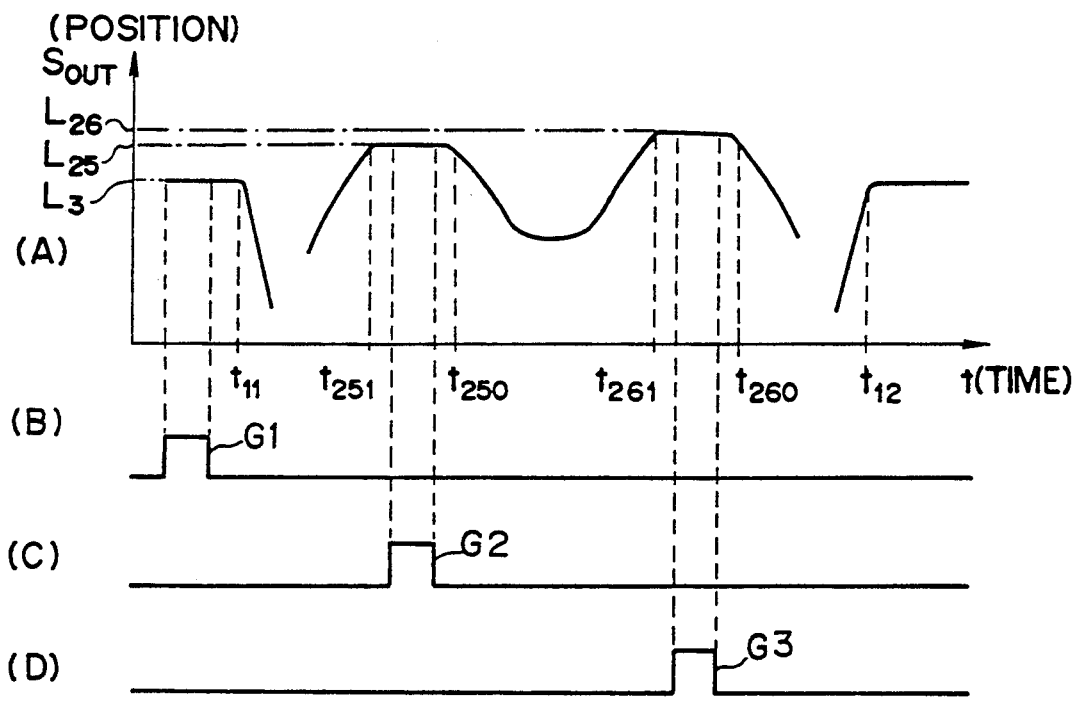
FIG. 10 is a signal waveform diagram depicting the operation of the third embodiment of the invention shown in FIG. 6.

The slide contact surfaces of the magnetic heads 25A and 26A (or 25B and 26B) are surrounded by a non-reflective member 34. Therefore, the light receiving element 32 outputs a head position detection signal, as shown in FIG. 10. That is, the signal level is set to a value $L_3$ during the time period (before $t_{11}$, or after $t_{12}$)

when the light source image 30 is applied to the outer cylindrical wall of the rotary drum, to a value $L_{25}$ during the time period ($t_{251}$ to $t_{250}$) when the light source image 30 is applied to the slide contact surface of the magnetic head 25A (or 25B), thus representing the position of the slide contact surface, and to a value $L_{26}$ during the time period ($t_{261}$ to $t_{260}$) when the light source image 30 is applied to the slide contact surface of the magnetic head 26A (or 26B), thus representing the position of the slide contact surface. For other than those periods, that is, for the periods ($t_{11}$ to $t_{251}$, $t_{250}$ to $t_{261}$, and $t_{260}$ to $t_{12}$), the light source image 30 is applied to the non-reflective number 34, and thus the signal level will be lower than the above-described levels.

As the rotary drum 3 rotates, the light source image 30 is applied to the rotary drum 3 and the magnetic heads 25A and 26A (or 25B and 26B) successively. Accordingly, the head position detection signal $S_{OUT}$ of the light receiving element 32 changes as shown in FIG. 10.

The head position detection signal is applied to an amount-of-protrusion measuring circuit 21. Circuit 21 reads gate signals G1, G2 and G3 (on the lines labeled (B), (C) and (D), respectively, in FIG. 10) which are produced in response to the signal levels $L_3$, $L_{25}$ and $L_{26}$. Circuit 21 then calculates the differences between signals $L_3$, $L_{25}$ and $L_{26}$ according to the following equations (5) and (6) to obtain data representing the amount of protrusion $P_{11}$ of the magnetic head 25A (or 25B) from the rotary drum 3 and the amount of protrusion $P_{12}$ of the magnetic head 26A (or 26B) from the rotary drum 3.

$$\Delta P11 = |L_{25} - L_3| \quad (5)$$

$$\Delta P12 = |L_{26} - L_3| \quad (6)$$

Figure 7:
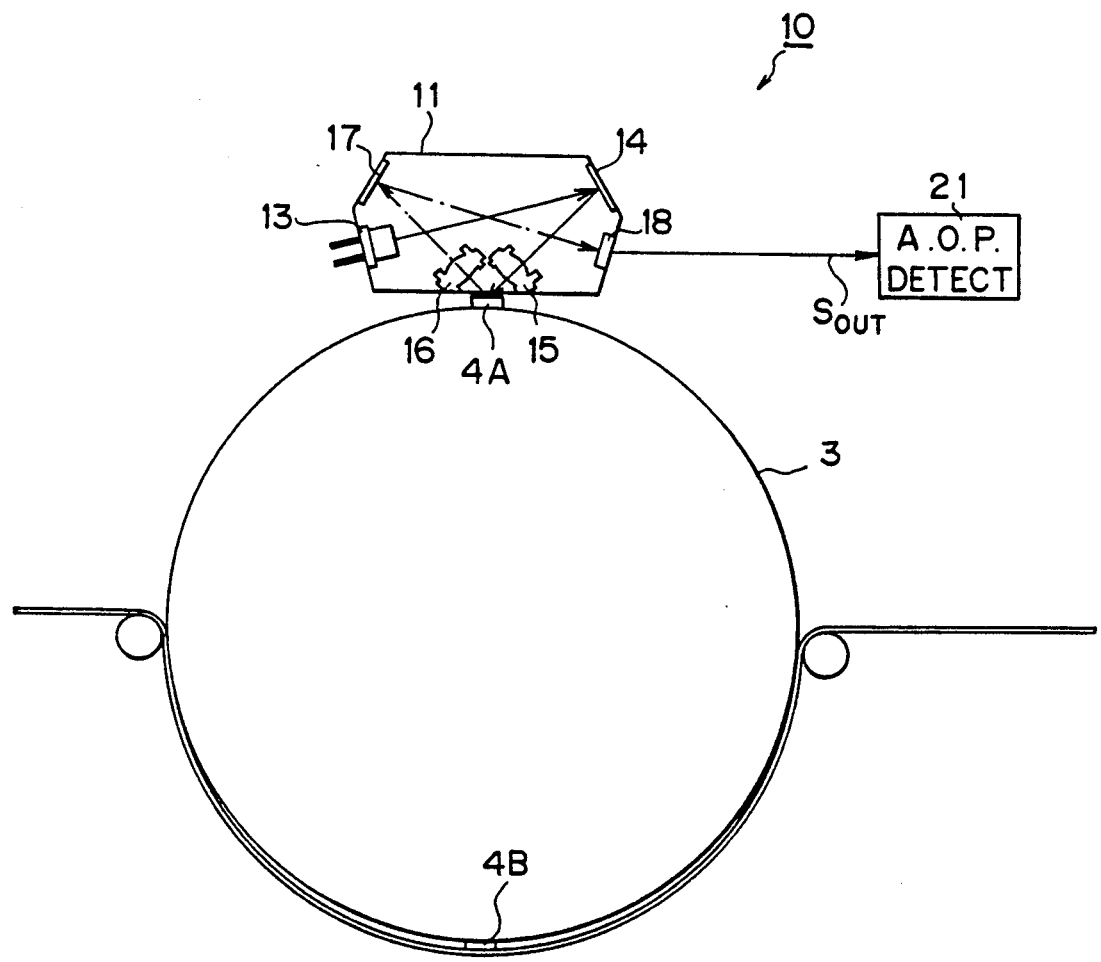
FIG. 7 is a plan view outlining the arrangement of the magnetic head position measuring device in accordance with a second embodiment of the invention.

As is apparent from the above description, in detecting the amounts of protrusion of the magnetic heads 25A and 26A (or 25B and 26B), which are shifted from each other both in the direction of the axis of rotation of and in the direction of rotation of the rotary drum, the position of the outer cylindrical wall of the rotary drum 3 is employed as the reference position, in a manner similar to the second embodiment shown in FIG. 7. Hence, self-diagnosis of the state of wear of the slide contact surfaces can be achieved with ease.

Furthermore, in the third embodiment, similar to the second embodiment described with reference to FIG. 7, it is unnecessary to provide a memory for storing reference position data to be compared with the positions of the magnetic heads 25A or 25B, and 26A or 26B and the results of detection of the amounts of protrusion are independent of the eccentricity of the rotary drum.

Fourth Embodiment of the Invention

A fourth embodiment of the invention will now be described with reference to FIG. 11, in which parts corresponding functionally to those already described with reference to FIG. 9, the third embodiment, are designated by the same reference numerals or characters.

Figure 11:
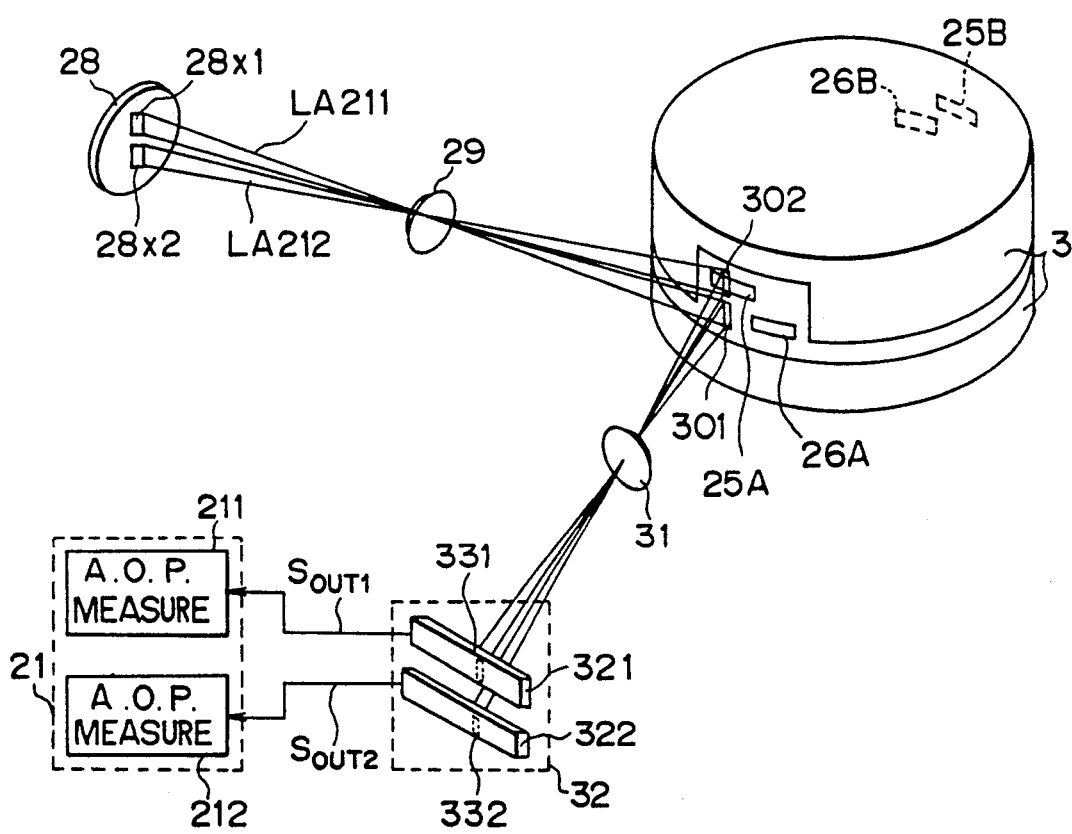
FIG. 11 is a perspective view showing the arrangement of a magnetic head position measuring device in accordance with a fourth embodiment of the invention.

As shown in FIG. 11, a magnetic head position measuring device 27 according to the invention comprises a light emitting element 28 with first and second light emitting sources 28X1 and 28X2 which are adapted to emit first and second irradiating light beams LA211 and LA212, respectively.

The first and second light emitting sources 28X1 and 28X2 are positioned at positions appropriate for the distance the first and second magnetic heads 25A and 26A (or 25B and 26B) are shifted from each other in the direction of the axis of rotation of the rotary drum 3. Irradiating light beams LA211 and LA212 emitted from the two light emitting sources 28X1 and 28X2 ar applied through one and the same condenser lens 29 to the magnetic heads 25A and 26A (or 25B and 26B), so as to form light sources images 301 and 302 thereon. The light beams reflected therefrom are applied through a condenser lens 31 to a light receiving unit 32 having light receiving elements 321 and 322.

As a result, light source images 331 and 332 are formed on light receiving elements 321 and 322, respectively, corresponding to the magnetic heads 25A and 26A (or 25B and 26B), respectively. Head position detection signals $S_{OUT1}$ and $S_{OUT2}$ are then output to amount-of-protrusion measuring circuit units 211 and 212, respectively.

As is apparent from the above description in the magnetic head position measuring device of this embodiment two irradiating light beams are applied through a common optical system to the two magnetic heads 25A and 26A (or 25B and 26B), which are shifted from each other in the direction of the axis of rotation of the rotary drum 3, and the light beams reflected therefrom are detected by the two position detecting elements 321 and 322.

Hence, the signal processing system in the fourth embodiment is much simpler than that of the third embodiment shown in FIG. 9. For instance, in the third embodiment, in order to calculate the amounts of protrusion of the magnetic heads 25A and 26A (or 25B and 26B), it is necessary to provide the signal processing system with the gate signals G1, G2 and G3 (on the lines labeled (B), (C) and (D) of FIG. 10) to extract the corresponding detection signals. By contrast, in the fourth embodiment (FIG. 11) it is unnecessary to provide such a signal processing system. Accordingly, its signal processing operation is correspondingly simpler.

Other Embodiments

The foregoing embodiments do not describe all of the arrangements by which the present invention may be effectuated. For example, in the above-described embodiments of the invention, the image of the light source is formed directly on the rotary drum 3. However, the invention is not limited thereto or thereby. That is, the same effect can be obtained by a method of converting the output light of the light source into a light beam by using a light shielding mask.

In the above-described embodiments of the invention, the light source comprises an LED. However the invention is not limited thereto or thereby. That is, a laser beam and many other light sources may be employed to like effect.

Furthermore, in the above-described embodiments, the amounts of protrusion of a pair of magnetic heads arranged diametrically opposite to each other are measured. However it should be noted that the technical concept of the invention is also applicable where the rotary drum has only one magnetic head or more than two magnetic heads.

In the above-described embodiments, the magnetic heads are integral with the rotary drum 3. However, the technical concept of the invention is applicable to a system in which a rotary disc with magnetic heads is rotated around the axis of stationary drum.

In the embodiment shown in FIG. 3, the irradiating light beam emitted from the light emitting element 13 and the light beam reflected from the irradiation point $M_{11}$ are bent by the two mirrors 14 and 17, respectively. However, for instance, instead of the mirrors, prisms may be employed.

In each of the third and fourth embodiments shown in FIGS. 9 and 11, the rotary drum has four magnetic heads, the magnetic heads 25A and 26A are shifted both in the direction of the axis of rotation of and in the direction of rotation of the rotary drum, and the magnetic heads 25B and 26B are shifted in the same manner. However, the invention is not limited thereto or thereby. That is, the technical concept of the invention is applicable where more magnetic heads are arranged on the rotary drum in the direction of rotation and where they are shifted in more than one step.

In the fourth embodiment shown in FIG. 11, two light emitting sources 28X1 and 28X2 are, respectively, provided for the two magnetic heads 25A and 26A (or 25B and 26B). The light emitting sources may, however, be replaced by one light emitting element elongated in the direction of the axis of rotation of the rotary drum, similarly to the third embodiment shown in FIG. 9.

In the above-described embodiments, a light source which emits light intermittently may be employed. In this case, with respect to the output of the light receiving element, the quantity of external light and the quantity of light from the light source image can be distinguished from each with ease. Thus, a head position detection signal $S_{OUT}$ can be obtained which is less affected by external light, i.e., having a high S/N (signal to noise) ratio. Furthermore, since the light source emits light intermittently, it can be driven with the maximum allowable electric power. In this manner the quantity of light incident to the light emitting element is increased, thus also increasing the S/N ratio of the head position measurement In the above-described embodiments, the output signals of the amount-of-wear detecting circuit 12 and the amount-of-protrusion detecting circuit are employed as the alarm signal and the input data of self-diagnosis. However, they may also be utilized for automatic correction of the characteristic of the video tape recorder, such as correction of the characteristics of the recording and reproducing circuits, for instance, optimization of the recording current and correction of the characteristics of the reproducing equalizer.

While there have been described preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A magnetic head position measuring device for a recording and/or reproducing apparatus including a rotary magnetic head unit comprising a rotor having a cylindrical wall and magnetic heads arranged on said rotor, said magnetic head position measuring device comprising:

a light source operable to emit an irradiating light beam having a light source image;
means for leading said irradiating light beam to said magnetic heads;
a light receiving element operable to receive a light beam reflected from said magnetic heads and to provide an output signal having a first part corresponding to a predetermined part of said cylindrical wall of said rotor and respective second parts corresponding to respective ones of said magnetic heads;
processing means for detecting and processing the difference between said first and second signal parts so as to provide an output signal representative of the position of said magnetic heads.

2. The magnetic head position measuring device as in claim 1, wherein said processing means is operable to detect and process the difference between said first and said respective second signal parts to provide an output signal representing an amount of protrusion of each magnetic head.

3. The magnetic head position measuring device as in claim 1, wherein said signal from said light receiving element has a plurality of first signal parts corresponding, respectively, to predetermined parts of the cylindrical wall of said rotor and wherein said processing means is further operable to process said first signal parts to provide an output signal representing an amount of eccentricity of said rotor.

4. A magnetic head position measuring device for a recording and/or reproducing apparatus including a rotary magnetic head unit having a rotor and a plurality of magnetic heads arranged on said rotor, said magnetic head position measuring device comprising:

light source means for emitting an irradiating light beam having a number of predetermined light source images;
means for applying said irradiating light beam onto said plurality of magnetic heads;
a number of light receiving means for receiving light reflected from said plurality of magnetic heads and the cylindrical wall of said rotor, the number of said light receiving means corresponding to the number of said light source images, said light receiving means being operable to provide a first signal part corresponding to a predetermined part of the cylindrical wall of said rotor and respective second signal part corresponding to respective ones of said magnetic heads; and
processing means for processing said first and second signal parts from said light receiving means to provide an output signal representative of the position of each magnetic head.

5. The magnetic head position measuring device as in claim 4, wherein said processing means is operable to provide an output signal representing an amount of protrusion of each magnetic head according to the difference between said first and second signal parts thus detected and processed.

6. The magnetic head position measuring device as in claim 4, wherein said light receiving means is further operable to provide a plurality of said first signal parts corresponding to respective predetermined parts of the cylindrical wall of said rotor and wherein said processing means is operable to process said plurality of first signal parts to provide an output signal representing a amount of eccentricity of said rotor.

* * * * *